Sept. 27, 1966  H. KELCH  3,274,838
ARRANGEMENT FOR TRANSFORMING A ROTARY MOTION
INTO A RECIPROCATING MOTION
Filed May 5, 1964  2 Sheets-Sheet 2
FIG.3
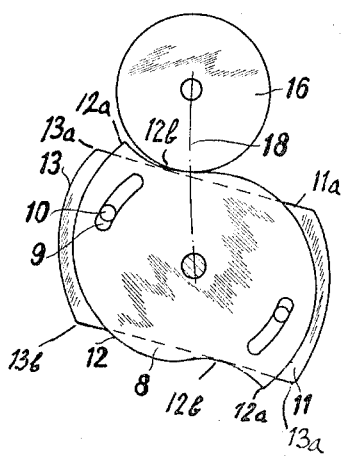
FIG.4
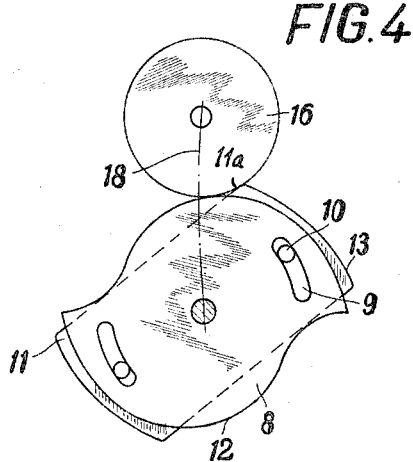
FIG.5
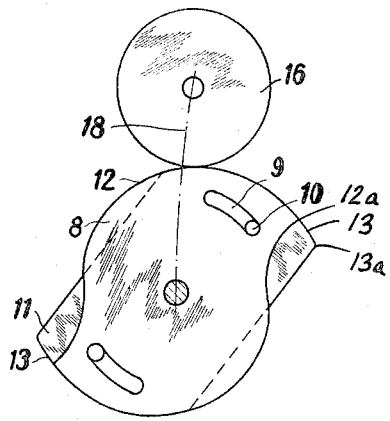
FIG.6
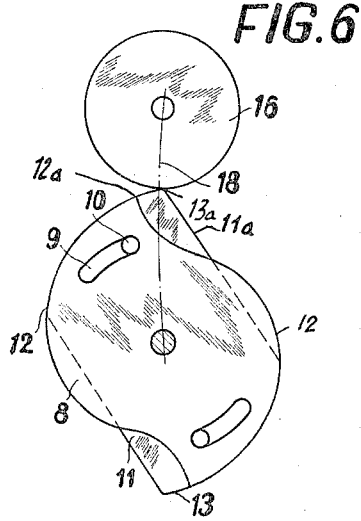
FIG.8
FIG.7
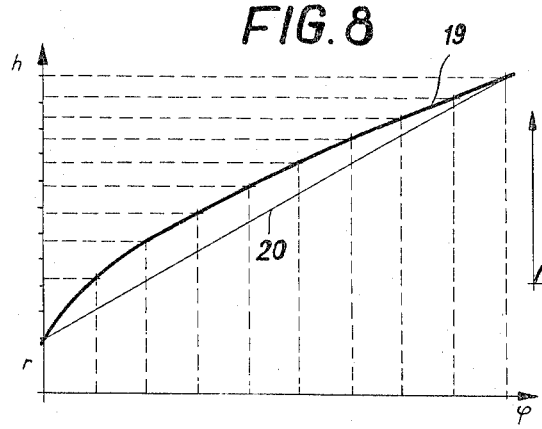
INVENTOR
Heinz Kelch
BY Michael S. Striker 3,274,838
ARRANGEMENT FOR TRANSFORMING A ROTARY MOTION INTO A RECIPROCATING MOTION
Heinz Kelch, Villingen, Germany, assignor to Kienzle Apparate G.m.b.H., Villingen/Schwarzwald, Germany
Filed May 5, 1964, Ser. No. 364,943
17 Claims. (Cl. 74—54)

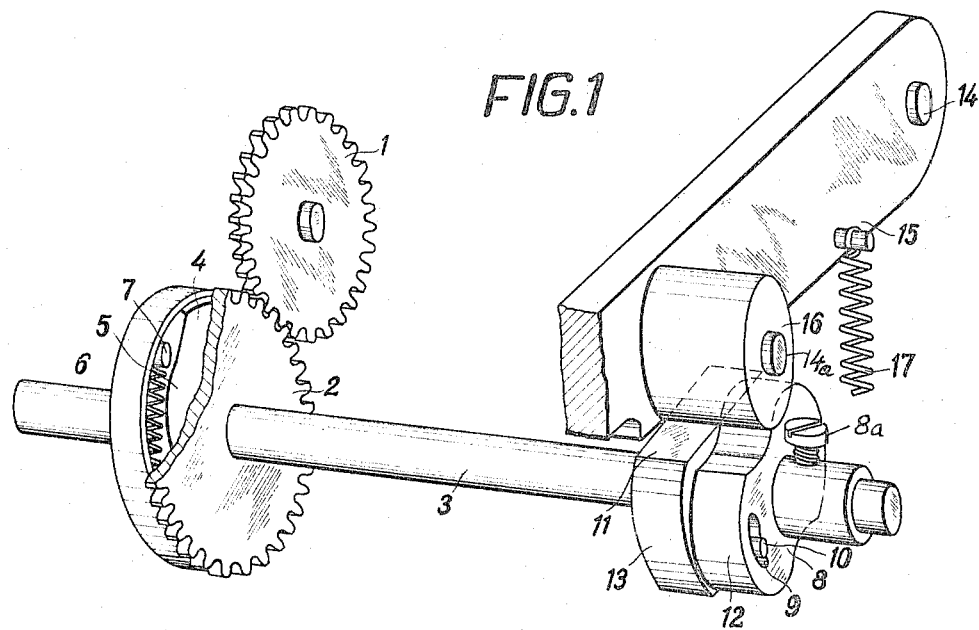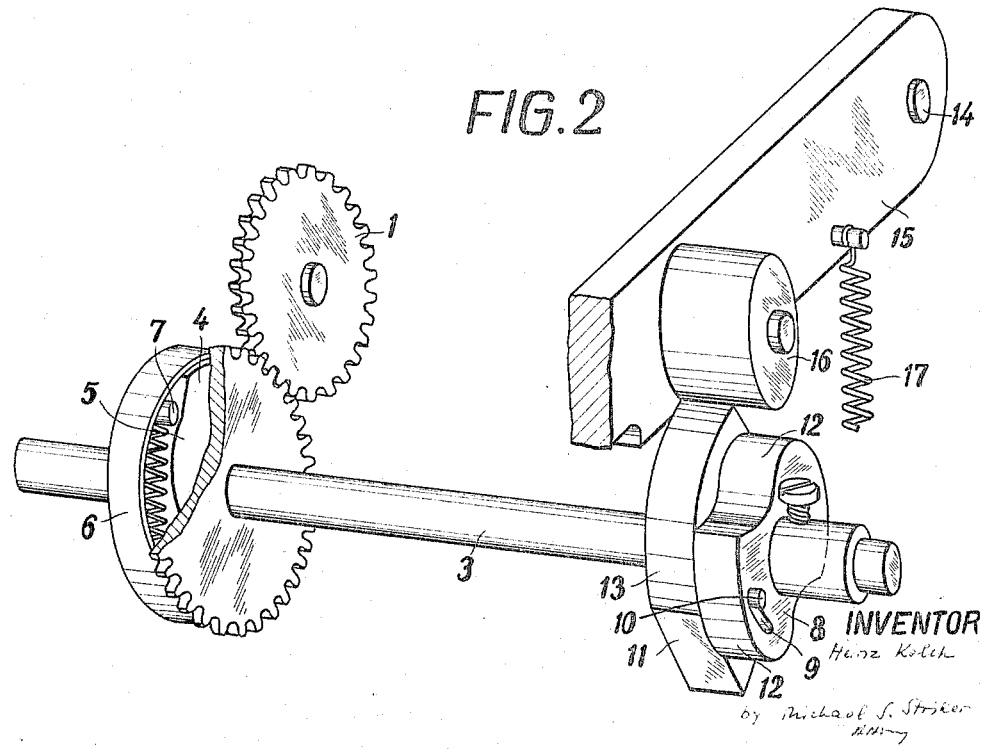

The present invention relates to an arrangement for transforming a rotary motion into a reciprocating motion, and more particularly to an arrangement of this type which is particularly suited for driving a counter of a taximeter. Instrument drives, and similar arrangements, frequently require the transformation of a rotary motion of a driving member into a precisely synchronized reciprocating motion of a driven member during rotation of the driving member in one direction of rotation.

More specifically, in a taximeter, the fare is computed on the basis of the rate of travel, or of the passage of time, whichever is higher at any given moment. A taximeter counter is therefore alternately driven by a drive from the wheels of the car, or by another drive driven by a clockwork. A shaft, from which the drive of the counter of the taximeter is activated, is driven either by the distance drive means or by the time drive means, whichever moves faster. The drive arrangement includes over-running clutch means to permit the drive of the shaft either from the distance drive means or from the time drive means.

In order to transform the continuous rotary motion of the shaft in one direction of rotation into a reciprocating movement of the member by which the counter of the taximeter is actuated, the actuating member is provided with a cam follower riding along the track of a cam which is secured to the shaft. It has been found that the engagement of the cam follower with the shoulder of the cam connecting the highest point of the cam track with the lowest point of the cam track, causes acceleration of the cam and consequently of the shaft so that the reciprocating motion of the actuating member is not precisely in synchronism with the rotary motion of the distance drive or time drive of the taximeter.

In my U.S. Patent No. 2,973,652 an arrangement is disclosed in which lost-motion means are provided between the cam and the shaft to compensate the irregularities of the cam movement. This prior construction required the use of a pointed cam follower which has certain disadvantages. In the event that a wider cam follower, such as a roller be used, the lost-motion means must be adapted to the diameter of the cam follower roller and a greater relative movement between the cam and the shaft must be permitted by the lost-motion means. This necessitates a steeper shape of the cam track, resulting in a greater torque which is undesirable.

It is one object of the invention to provide an arrangement for transforming a rotary motion into a reciprocating motion in which the effective torque acting on the cam is small, while the rotary speed of the cam is exactly uniform.

In order to achieve this object, the cam track gradient must be as low as possible, and the friction losses must be small, and the same energy must be used in any angular position of the shaft or of the cam, respectively. This is particularly advantageous during the drive of the shaft from a clockwork. Clockwork regulators which are driven at varying torques tend to become inaccurate. Particularly for taximeters, in which the distance and the time of a trip are represented in the fare, a uniform and small turning movement acting on the shaft is of great importance.

It is another object of the present invention to provide an arrangement for transforming a rotary motion into a reciprocating motion in such a manner that a cam and its shaft are not accelerated in the direction of rotation by the pressure of a spring-loaded cam follower.

Another object of the invention is to prevent any direct pressure of the cam follower on the cam when the cam follower moves inwardly toward the shaft.

Another object of the invention is to provide cam means having such a gradient as to compensate the variation of the spring force of the spring acting on a reciprocable member whose cam follower engages the cam track.

With these objects in view, the present invention relates to an arrangement for transforming a rotary motion into a reciprocating motion. One embodiment of the invention comprises a shaft which may be driven from a rotary drive member through a uni-directional over-running clutch in one direction of rotation, a main cam fixed on the shaft, an auxiliary cam freely turnable on the shaft, and a reciprocating member having a cam follower biased toward the cams and reciprocated by the same.

The main cam and the auxiliary cam are connected by lost-motion means, preferably a pin and slot connection, and are turnable relative to each other between a first position and a second position. In the first relative position, the outer end of the cam track of the auxiliary cam trails the outer end of the cam track of the main cam, so that the inwardly moving cam follower shifts the auxiliary cam to the second relative position without engaging the outer end of the cam track of the main cam whereby acceleration of the main cam and of the shaft by the spring pressure of the reciprocating member is prevented.

The arrangement is such that the higher outer end of the cam track of the auxiliary cam and the inner lower end of the cam track of the main cam are located along the path of movement of the cam follower when the cams are in the first relative position.

A flat portion of the auxiliary cam projects beyond the cam track of the main cam in the second relative position of the cams, so that the cam follower engages such flat portion and turns the auxiliary cam from the second position to the first position.

The cam track of the auxiliary cam matches the shape of the higher end portion of the main cam so that the cams form a composite cam track in the first position of the cams, with the outer end portion of the cam track of the auxiliary cam forming a continuation of the outer end portion of the cam track of the main cam.

The composite cam track can be designed in such a manner as to compensate for the variation of the spring force of the spring by which the cam follower of the reciprocating member is urged against the cam tracks of the cams.

In the preferred embodiment of the invention, the cam follower is a roller, and the reciprocating member is a lever. The main cam and the auxiliary cam each have a pair of diametrically arranged rising spiral-shaped cam tracks, connected by steep portions. Consequently, the reciprocating member performs to reciprocating movements during each revolution of the shaft.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary perspective view illustrating a preferred embodiment of the invention, partially in section;

FIG. 2 is a perspective view corresponding to FIG. 1 but illustrating another operational position of the device;

FIG. 3 is a fragmentary end view, partially in section, illustrating the main cam and the auxiliary cam in one operational position;

FIG. 4 is an end view corresponding to FIG. 3 and illustrating a following operational position;

FIG. 5 is an end view corresponding to FIG. 3 and illustrating the cams in the following operational position;

FIG. 6 is an end view corresponding to FIG. 3 and illustrating the cams in another operational position;

FIG. 7 is a diagram illustrating in graphical representation the movements of the cam follower; and FIG. 8 is a diagram graphically representing different shapes of the composite cam track formed by the main cam and the auxiliary cam.

Referring now to drawings and more particularly to FIGS. 1 and 2, a drive gear 1, which may be the output gear of the clockwork, or of the distance drive of the taximeter, meshes with a gear 2 which is mounted for free turning movement on a shaft 3, and is fixedly connected with the drive member 4 of an over-running uni-directional clutch. Member 4 has recessed cam portions 5 cooperating with spring-loaded rollers 7 which in turned positions of member 4 are pressed by cam portions 5 against the inner surface of a drum member 6 which is fixedly secured to shaft 3. A corresponding arrangement is provided for the other drive of the shaft, so that shaft 3 can be driven either from a clockwork, or from the distance drive of the taximeter in one direction of rotation, depending on which drive moves faster.

A main cam 8 is fixed on shaft 3 and is provided with two circular slots 9 whose centers coincide with the axis of shaft 3. Cam 8 is preferably secured to shaft 3 by screw 8a passing through a threaded bore in the hub portion of cam 8.

An auxiliary cam 11 is mounted adjacent cam 8 for free turning movement on shaft 3, but none-movable in axial direction. A pair of pins 8 are secured to cam 11 and located in slots 9 forming a lost-motion connection. Each cam has cam tracks which cooperate with a cam follower roller 16 whose axial length corresponds to the axial thickness of cams 8 and 11. Cam follower roller 16 is mounted for turning movement on a pin 14a fixed on an actuating member 15 which is mounted on a pivot pin 14 for reciprocating angular movement. A spring 17 has one end secured to member 15, and the other end secured to a fixed point, not shown, so that cam follower roller 16 is urged toward the cam tracks 12 and 13 of cams 8 and 11, and as best seen in FIGS. 3 to 6, the axis of the cam follower roller 16, and pivot 14 are disposed in such a relationship to shaft 3 that the axis of cam follower roller 16 moves along a circular path 18 passing through the axis of shaft 3.

Each cam 8 or 11 is symmetrical to a plane passing through the axis of shaft 3, and has two equivalent and symmetrical cam tracks 12, 13.

The fixed main cam 8 has two spiral-shaped cam tracks 12 with higher outer ends 12a, and lower inner ends 12b, as best seen in FIGS. 3 to 6. The freely turnable cam 11 has two spiral-shaped cam tracks 13 having higher outer ends 13a, and lower inner ends 13b. Cam tracks 13 have a shape matching the shape of the outer end portions of cam tracks 11, and as best seen in FIGS. 5 and 6, cams 8 and 11 have a first relative position in which pins 10 are located at the ends of slot 9, and in which cam tracks 11 and 13 partly coincide, with the outer end portion of cam track 13 forming a continuation of cam track 11 terminating in the higher outer end 13a of cam track 13.

The cams have a second position shown in FIG. 3, and are urged to this position by the pressure by cam follower roller 16 on the inner end 12b of cam track 12 of cam 8 and on the flat portion 11a of cam 11 which coincides with the inner end 12b of cam track 12 in the second relative position of the cams shown in FIGS. 3 and 4.

The lost-motion pin and slot connection 9, 10 couples cams 8 and 11 for rotation while shaft 3 and main cam 8 rotate in counterclockwise direction so that auxiliary cam 13 moves at the same speed in the first position shown in FIGS. 5 and 6. However, the auxiliary cam 11 is free to turn in counterclockwise direction relative to main cam 8 when driven faster than cam 8. No coupling of cams 8 and 11 is achieved by the lost-motion connection 9, 10 in the second relative position of the cams shown in FIGS. 3 and 4, since pins 10 are located in slots 9 spaced from the ends of the slots.

The device operates in the following manner:

Main cam 8 is rotated in counterclockwise direction by shaft 3 which is driven either from the time drive means or from the distance drive means of a taxicab in counterclockwise direction. Assuming an initial position corresponding to the position shown in FIGS. 1 and 3, the rising cam track 12 of cam 8 will cause movement of cam follower 16 and of reciprocable member 15 in upward direction since cam follower 16 is at first located at the lowest inner end 12b of cam track 12. After turning together through a certain angle, cams 8 and 11 will be in the turned position shown in FIG. 4, and cam follower roller 16 will engage the projecting flat portion 11a of auxiliary cam 11 and hold the same in the illustrated position while cam 8 continues its movement in counterclockwise direction, further raising cam follower 16.

During such relative turning movement between the cams, the position of FIG. 5 will be reached in which the matching cam track portions of the main cam and the auxiliary cam form a composite cam track, with the outer portion of cam track 13 forming an extension of cam track 11 and the outer end 13a of cam track 13 trailing the higher outer end 12a of cam track 12 of main cam 8. In this position, pins 10 couple auxiliary cam 11 with main cam 8 so that the cams turn together to the position shown in FIG. 6 in which cam follower 16 rests on the higher end 13a of cam track 13 of auxiliary cam 11, and reciprocating member 15 reaches its higher dead center position.

When cams 8 and 11 turn beyond this point, the pressure of spring 17 urges cam follower 16 against the flat portion 11a of cam 11 so that cam 11 turns relative to cam 8, moving faster in counterclockwise direction than the driven cam 8 whereby pins 10 are displaced in slots 9.

The relative movement between cam 11 and cam 8 terminates when the inward moving cam follower 16 reaches the inner end 12b of cam track 12 of main cam 8, having turned cam 11 to a position in which the flat portion 11a of cam 11 coincides with the inner end 12b. This second relative position is shown in FIG. 3 in which cam follower 16 is in its lowest position and reciprocable member 15 is in the lower dead center position.

In the position of FIG. 6, the operative outer end 13a of cam track 13 of auxiliary cam 11, and the inner end 12b of cam track 12 of main cam 8 are located along the circular path 18 of the axis of cam follower roller 16 which path, as explained above, passes through the axis of shaft 3. Therefore, inward movement of cam follower roller 16 out of the position of FIG. 6 will result in the position of FIG. 3. The cams are turned to this position exclusively by the action of cam follower roller 16, and since the pins 10 are spaced from the corresponding ends of slot 9 in the position of FIG. 3, the lost-motion means have no influence on this operation.

FIG. 7 illustrates the turning angle on the horizontal axis and the radial distances of the movement of cam follower 16 along the vertical axis. The radial distances are indicated on the vertical axis by the character $h$, the turning angles of 180° by the character $\pi$. It will be seen that after each turning motion of the cams through 180 degrees, the cam follower reaches its highest position from which it then rapidly moves to its lower position.

The graphs 19 and 20 in FIG. 8 indicate cam shapes of the composite cam track formed by cams 8 and 11. The horizontal axis represents the turning angle $\varphi$, and the vertical axis the radial distance of $h$ of the composite cam tracks from the axis of shaft 3. The straight line 20 represents the shape of the composite cam track corresponding to a uniform gradient and a constant speed of cam follower 16 during its upward stroke.

The graph 20 illustrates a modified composite cam track of a varying gradient selected to compensate for the variations of the resilient resistance of spring 17 against deformation. As the turning angle increases, the gradient of the composite cam track is reduced, and the increasing spring force of spring 17 is compensated by the reduced gradient of the composite cam track 12, 13, so that for each angular unit of the turning angle of the cams, the distance of travel of member 15 is not the same, but is greater during the first part of the upward stroke and smaller during the second part of the upper stroke. Graphs 19 and 20 start at the radial distance $r$ corresponding to the radial distance between the lowest points of the cam tracks 12 and 13 and the axis of the cams.

It will be understood that each of the elements described above, or two or more together, may also find a useful application in other types of transmissions for transforming a rotary motion into a reciprocating motion, differing from the types described above.

While the invention has been illustrated and described as embodied in a cam drive including a main drive cam and an auxiliary cam connected to the main drive cam by lost-motion means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An arrangement for transforming a rotary motion into a reciprocating motion, comprising, in combination, a rotary drive member rotating in one direction; a shaft means; uni-directional over-running clutch means connecting said drive member with said shaft means for driving the same in one direction of rotation; a main cam fixed on said shaft means and having at least one rising first cam track having a lower inner end and a higher outer end; an auxiliary cam mounted on said shaft means for free turning movement and having at least a rising second cam track having a lower inner end and a higher outer end; and a reciprocable member having a cam follower baised toward said cam tracks and reciprocated by the same while moving said auxiliary cam between first and second positions in which said outer end of said second cam track trails, or leads, respectively, said outer end of said first cam track in said direction of rotation, said cam follower moving said auxiliary cam from said first to said second position while moving inward from the outer end of said second cam track toward the inner end of said first cam track whereby acceleration of said main cam and of said shaft means in said direction of rotation by engagement of said outer end of said first cam track by said cam follower moving inward is prevented.

2. An arrangement for transforming a rotary motion into a reciprocating motion, comprising, in combination, a rotary drive member rotating in one direction; a shaft means; uni-directional over-running clutch means connecting said drive member with said shaft means for driving the same in one direction of rotation; a main cam fixed on said shaft means and having at least one rising first cam track having a lower inner end and a higher outer end; an auxiliary cam mounted on said shaft means for free turning movement and having at least a rising second cam track having a lower inner end and a higher outer end; a reciprocable member having a cam follower biased toward said cam tracks and reciprocated by the same while moving said auxiliary cam between first and second positions in which said outer end of said second cam track trails, or leads, respectively, said outer end of said first cam track in said direction of rotation, said cam follower moving said auxiliary cam from said first to said second position while moving inward from the outer end of said second cam track toward the inner end of said first cam track whereby acceleration of said main cam and of said shaft means in said direction of rotation by engagement of said outer end of said first cam track by said cam follower moving inward is prevented; and lost-motion means connecting said auxiliary cam with said main cam and coupling said cams in said first position for synchronous movement in said direction of rotation while driven by said main cam whereas said auxiliary cam is free to turn faster than said main cam in said direction of rotation so as to be moved to said second position when said cam follower moves inward.

3. An arrangement for transforming a rotary motion into a reciprocating motion, comprising, in combination, a rotary drive member rotating in one direction; a shaft means; uni-directional over-running clutch means connecting said drive member with said shaft means for driving the same in one direction of rotation; a main cam fixed on said shaft means and having at least one rising first cam track having a lower inner end and a higher outer end; an auxiliary cam mounted on said shaft means for free turning movement and having at least a rising second cam track having a lower inner end and a higher outer end higher than the outer end of said first cam track; a reciprocable member having a cam follower biased toward said cam tracks and reciprocated by the same while moving said auxiliary cam between first and second positions in which said outer end of said second cam track trails, or leads, respectively, said outer end of said first cam track in said direction of rotation, said cam follower moving said auxiliary cam from said first to said second position while moving inward from the outer end of said second cam track toward the inner end of said first cam track whereby acceleration of said main cam and of said shaft means in said direction of rotation by engagement of said outer end of said first cam track by said cam follower moving inward is prevented; and lost-motion means connecting said auxiliary cam with said main cam and coupling said cams in said first position for synchronous movement in said direction of rotation while driven by said main cam whereas said auxiliary cam is free to turn faster than said main cam in said direction of rotation so as to be moved to said second position when said cam follower moves inward, said outer end of said second cam track and said inner end of said first cam track being located along the path of movement of said cam follower so that in said second position the same is located on said inner end of said first cam track.

4. An arrangement for transforming a rotary motion into a reciprocating motion, comprising, in combination, a rotary drive member rotating in one direction; a shaft means; uni-directional over-running clutch means connecting said drive member with said shaft means for driving the same in one direction of rotation; a main cam fixed on said shaft means and having at least one rising first cam track having a lower inner end and a higher outer end; an auxiliary cam mounted on said shaft means for free turning movement and having at least a rising second cam track matching the shape of a portion of said first cam track adjacent said outer end of the same having a lower inner end and a higher outer end; a reciprocable member having a cam follower biased toward said cam tracks and reciprocated by the same while moving said auxiliary cam between first and second positions in which said outer end of said second cam track trails, or leads, respectively, said outer end of said first cam track in said direction of rotation, said cam follower moving said auxiliary cam from said first to said second cam track toward the inner end of said first cam track whereby acceleration of said main cam and of said shaft means in said direction of rotation by engagement of said outer end of said first cam track by said cam follower moving inward is prevented; and lost-motion means connecting said auxiliary cam with said main cam and coupling said cams in said first position for synchronous movement in said direction of rotation while driven by said main cam with said second cam track located along said matching portion of said first cam track and forming a continuation of the same between said outer ends of said first and second cam tracks whereas said auxiliary cam is free to turn faster than said main cam in said direction of rotation so as to be moved to said second position when said cam follower moves inward.

5. An arrangement for transforming a rotary motion into a reciprocating motion, comprising, in combination, a rotary drive member rotating in one direction; a shaft means; uni-directional over-running clutch means connecting said drive member with said shaft means for driving the same in one direction of rotation; a main cam fixed on said shaft means and having at least one rising first cam track having a lower inner end and a higher outer end; an auxiliary cam mounted on said shaft means for free turning movement and having at least a rising second cam track having a lower inner end and a higher outer end higher than the outer end of said first cam track, said auxiliary cam having a flat portion extending inward from said outer end of said second cam track; a reciprocable member having a cam follower biased toward said cam tracks and reciprocated by the same while moving said auxiliary cam between first and second positions in which said outer end of said second cam track trails, or leads, respectively, said outer end of said first cam track in said direction of rotation, said cam follower moving said auxiliary cam from said first to said second position while moving inward from the outer end of said second cam track toward the inner end of said first cam track whereby acceleration of said main cam and of said shaft means in said direction of rotation by engagement of said outer end of said first cam track by said cam follower moving inward is prevented; and lost-motion means connecting said auxiliary cam with said main cam and coupling said cams in said first position for synchronous movement in said direction of rotation while driven by said main cam whereas said auxiliary cam is free to turn faster than said main cam in said direction of rotation so as to be moved to said second position when said cam follower moves inward along said flat portion to a position resting on the inner end of said first cam track, said outer end of said second cam track and said inner end of said first cam track being located along the path of movement of said cam follower so that in said second position the same is located on said inner end of said first cam track.

6. An arrangement for transforming a rotary motion into a reciprocating motion, comprising, in combination, a rotary drive member rotating in one direction; a shaft means; uni-directional over-running clutch means connecting said drive member with said shaft means for driving the same in one direction of rotation; a main cam fixed on said shaft means and having at least one rising first cam track having a lower inner end and a higher outer end; an auxiliary cam mounted on said shaft means for free turning movement and having at least a rising second cam track having a lower inner end and a higher outer end; a reciprocable member having a cam follower biased toward said cam tracks and reciprocated by the same while moving said auxiliary cam between first and second positions in which said outer end of said second cam track trails, or leads, respectively, said outer end of said first cam track in said direction of rotation, said cam follower moving said auxiliary cam from said first to said second position while moving inward from the outer end of said second cam track toward the inner end of said first cam track whereby acceleration of said main cam and of said shaft means in said direction of rotation by engagement of said outer end of said first cam track by said cam follower moving inward is prevented; and lost-motion means including a slot in said main cam, and a pin secured to said auxiliary cam and located in said slot for connecting said auxiliary cam with said main cam and coupling said cams in said first position for synchronous movement in said direction of rotation while driven by said main cam whereas said auxiliary cam is free to turn faster than said main cam in said direction of rotation so as to be moved to said second position when said cam follower moves inward.

7. An arrangement for transforming a rotary motion into a reciprocating motion, comprising, in combination, a rotary drive member rotating in one direction; a shaft means; uni-directional over-running clutch means connecting said drive member with said shaft means for driving the same in one direction of rotation; a main cam fixed on said shaft means and having at least one rising first cam track having a lower inner end and a higher outer end; an auxiliary cam mounted on said shaft means for free turning movement and having at least a rising second cam track having a lower inner end and a higher outer end; a reciprocable member having a cam follower roller; spring means urging said reciprocable member to move said cam follower roller toward said cam tracks and reciprocated by the same while moving said auxiliary cam between first and second positions in which said outer end of said second cam track trails, or leads, respectively, said outer end of said first cam track in said direction of rotation, said cam follower roller moving said auxiliary cam from said first to said second position while moving inward from the outer end of said second cam track toward the inner end of said first cam track whereby acceleration of said main cam and of said shaft means in said direction of rotation by engagement of said outer end of said first cam track by said cam follower roller moving inward is prevented; and lost-motion means connecting said auxiliary cam with said main cam and coupling said cams in said first position for synchronous movement in said direction of rotation while driven by said main cam whereas said auxiliary cam is free to turn faster than said main cam in said direction of rotation so as to be moved to said second position when said cam follower moves inward.

8. An arrangement for transforming a rotary motion into a reciprocating motion, comprising, in combination, a rotary drive member rotating in one direction; a shaft means; uni-directional over-running clutch means connecting said drive member with said shaft means for driving the same in one direction of rotation; a main cam fixed on said shaft means and having at least one rising first cam track having a lower inner end and a higher outer end; an auxiliary cam mounted on said shaft means for free turning movement and having at least a rising second cam track having a lower inner end and a higher outer end higher than the outer end of said first cam track, said auxiliary cam having a flat portion extending inward from said outer end of said second cam track; a reciprocable member having a cam follower biased toward said cam tracks and reciprocated by the same while moving said auxiliary cam between first and second positions in which said outer end of said second cam track trails, or leads, respectively, said outer end of said first cam track in said direction of rotation, said cam follower moving said auxiliary cam from said first to said second position while moving inward from the outer end of said second cam track toward the inner end of said first cam track whereby acceleration of said main cam and of said shaft means in said direction of rotation by engagement of said outer end of said first cam track by said cam follower moving inward is prevented; and lost-motion means connecting said auxiliary cam with said main cam and coupling said cams in said first position for synchronous movement in said direction of rotation while driven by said main cam whereas said auxiliary cam is free to turn faster than said main cam in said direction of rotation so as to be moved to said second position when said cam follower moves inward along said flat portion to a position resting on the inner end of said first cam track, said flat portion projecting from said first cam track in said second position of said auxiliary cam so as to be engaged by said cam follower moving along said first cam track so that said auxiliary cam is turned to said first position, said outer end of said second cam track and said inner end of said first cam track being located along the path of movement of said cam follower so that in said second position the same is located on said inner end of said first cam track.

9. An arrangement for transforming a rotary motion into a reciprocating motion, comprising, in combination, a rotary drive member rotating in one direction; a shaft means; uni-directional over-running clutch means connecting said drive member with said shaft means for driving the same in one direction of rotation; a main cam fixed on said shaft means and having at least one rising first cam track having a lower inner end and a higher outer end; an auxiliary cam mounted on said shaft means for free turning movement and having at least a rising second cam track matching the shape of a portion of said first cam track adjacent said outer end of the same having a lower inner end and a higher outer end, said auxiliary cam having a flat portion extending inward from said outer end of said second cam track; a reciprocable member having a cam follower biased toward said cam tracks and reciprocated by the same while moving said auxiliary cam between first and second positions in which said outer end of said second cam track trails, or leads, respectively, said outer end of said first cam track in said direction of rotation, said cam follower moving said auxiliary cam from said first to said second cam track toward the inner end of said first cam track whereby acceleration of said main cam and of said shaft means in said direction of rotation by engagement of said outer end of said first cam track by said cam follower moving inward is prevented; and lost-motion means including a slot in said main cam, and a pin secured to said auxiliary cam and located in said slot for connecting said auxiliary cam with said main cam and coupling said cams in said first position for synchronous movement in said direction of rotation while driven by said main cam with said second cam track located along said matching portion of said first cam track and forming a continuation of the same between said outer ends of said first and second cam tracks whereas said auxiliary cam is free to turn faster than said main cam in said direction of rotation so as to be moved to said second position when said cam follower moves inward along said flat portion to a position resting on the inner end of said first cam track, said flat portion projecting from said first cam track in said second position of said auxiliary cam so as to be engaged by said cam follower moving along said first cam track so that said auxiliary cam is turned to said first position.

10. An arrangement for transforming a rotary motion into a reciprocating motion, comprising, in combination, a rotary drive member rotating in one direction; a shaft means; uni-directional over-running clutch means connecting said drive member with said shaft means for driving the same in one direction of rotation; a main cam fixed on said shaft means and having at least one rising first cam track having a lower inner end and a higher outer end; an auxiliary cam mounted on said shaft means for free turning movement and having at least a rising second cam track matching the shape of a portion of said first cam track adjacent said outer end of the same having a lower inner end and a higher outer end, said auxiliary cam having a flat portion extending inward from said outer end of said second cam track; a reciprocable member having a cam follower biased toward said cam tracks and reciprocated by the same while moving said auxiliary cam between first and second positions in which said outer end of said second cam track trails, or leads, respectively, said outer end of said first cam track in said direction of rotation, said cam follower moving said auxiliary cam from said first to said second cam track toward the inner end of said first cam track whereby acceleration of said main cam and of said shaft means in said direction of rotation by engagement of said outer end of said first cam track by said cam follower moving inward is prevented; and lost-motion means connecting said auxiliary cam with said main cam and coupling said cams in said first position for synchronous movement in said direction of rotation while driven by said main cam with said second cam track located along said matching portion of said first cam track and forming a continuation of the same between said outer ends of said first and second cam tracks whereas said auxiliary cam is free to turn faster than said main cam in said direction of rotation so as to be moved to said second position when said cam follower moves inward along said flat portion to a position resting on the inner end of said first cam track, said flat portion projecting from said first cam track in said second position of said auxiliary cam so as to be engaged by said cam follower moving along said first cam track so that said auxiliary cam is turned to said first position.

11. An arrangement as set forth in claim 10 wherein said second cam track is located outwardly of said first cam track in said second position of said auxiliary cam.

12. An arrangement as set forth in claim 10 wherein the composite cam track formed by said first and second cam tracks in said first position has such a gradient as to compensate the variation of the spring force of said spring means during reciprocation of said reciprocable member whereby a constant torque acts on said shaft means.

13. An arrangement for transforming a rotary motion into a reciprocating motion comprising, in combination, a rotary drive member rotating in one direction; a shaft means; uni-directional over-running clutch means connecting said drive member with said shaft means for driving the same in one direction of rotation; a main cam fixed on said shaft means and having a pair of diametrically disposed substantially spiral-shaped rising first cam tracks having lower inner ends and higher outer ends respectively connected by steep shoulders; an auxiliary cam mounted on said shaft means for free turning movement adjacent said main cam and having a pair of diametrically disposed substantially spiral-shaped rising second cam tracks matching in shape the outer end portions of said first cam tracks, said second cam tracks having lower inner ends and higher outer ends, said outer ends being higher than the outer ends of said first cam tracks, said inner and outer ends of said second cam tracks being connected by flat portions; a reciprocable member having a cam follower; spring means urging said reciprocable member to move said cam follower toward said shaft means and said cam tracks along a path passing through the axis of said shaft means, said cam follower reciprocating said reciprocable member while being reciprocated by said cams and moving said auxiliary cam between a first position in which said outer ends of said second cam tracks trail said outer ends of said first cam tracks and in which the outer end portions of said second cam tracks form continuations of said first cam tracks and a second position in which said outer ends of said second cam tracks lead the outer ends of said first cam tracks and in which said flat portions of said auxiliary cam project outwardly from said first cam tracks while the inner ends of said first cam tracks coincide with said flat portions of said auxiliary cam; said cam follower moving said auxiliary cam from said first to said second position while moving inward whereby acceleration of said main cam and of said shaft means by engagement of said outer ends of said first cam tracks by said cam follower moving inward is prevented, and from said second position to said first position while moving outward; and lost-motion means connecting said auxiliary cam with said main cam and coupling said cams in said first position for synchronous movement in said direction of rotation while driven by said main cam whereas said auxiliary cam is free to turn faster than said main cam in said direction of rotation so as to be moved to said second position when said cam follower moves inward along one of said flat portions to a position resting on the inner end of one of said first cam tracks, said outer ends of said second cam tracks and said inner ends of said first cam tracks being located along the path of movement of said cam follower so that the same is located on the inner end of one of said first cam tracks in said second position of said auxiliary cam.

14. An arrangement as set forth in claim 13 wherein said lost-motion means includes a slot formed in one of said cams, and a pin secured to the other of said cams and located in said slot, said pin and one end of said slot abutting each other in said first position.

15. An arrangement as set forth in claim 13 wherein said cam follower is a roller, and wherein said reciprocable member is a lever turnably mounted at one end thereof and turnably supporting said cam follower roller.

16. An arrangement as set forth in claim 13 wherein the composite cam tracks formed by said first and second tracks in said first position have such a gradient so as to compensate the variations of the spring force of said spring means during reciprocation of said reciprocable member whereby a constant torque acts on said shaft means.

17. An arrangement for transforming a rotary motion into a reciprocating motion, comprising, in combination, a shaft means driven in one direction of rotation; a main cam fixed on said shaft means and having at least one rising first cam track having a lower inner end and a higher outer end higher than the outer end of said first cam track; an auxiliary cam mounted on said shaft means for free turning movement and having at least a rising second cam track matching the shape of a portion of said first cam track adjacent said outer end of the same having a lower inner end and a higher outer end; a reciprocable member having a cam follower biased toward said cam tracks and reciprocated by the same while moving said auxiliary cam between first and second positions in which said outer end of said second cam track trails, or leads, respectively, said outer end of said first cam track in said direction of rotation, said cam follower moving said auxiliary cam from said first to said second cam track toward the inner end of said first cam track whereby acceleration of said main cam and of said shaft means in said direction of rotation by engagement of said outer end of said first cam track by said cam follower moving inward is prevented; and lost-motion means connecting said auxiliary cam with said cam and coupling said cams in said first position for synchronous movement in said direction of rotation while driven by said main cam with said second cam track located along said matching portion of said first cam track and forming a continuation of the same between said outer ends of said first and second cam tracks whereas said auxiliary cam is free to turn faster than said main cam in said direction of rotation so as to be moved to said second position when said cam follower moves inward, said outer end of said second cam track and said inner end of said first cam track being located along the path of movement of said cam follower so that in said second position the same is located on said inner end of said first cam track.

References Cited by the Examiner
UNITED STATES PATENTS

| 2,050,825 | 8/1936  | Bissell | 74—568 X |
| 2,155,594 | 4/1939  | Hart    | 74—97    |
| 2,913,048 | 11/1959 | Laviana | 74—54 X  |
| 2,973,652 | 3/1961  | Kelch   | 74—54    |

FOREIGN PATENTS 280,101 11/1914 Germany.

FRED C. MATTERN, JR., *Primary Examiner.*

F. E. BAKER, *Assistant Examiner.*